United States Patent [19]

Petrov et al.

[11] 4,278,641

[45] Jul. 14, 1981

[54] METHOD FOR EXTRACTING RHENIUM AND TUNGSTEN FROM WASTES OF RHENIUM-TUNGSTEN ALLOYS

[75] Inventors: Nikolov Y. Petrov; Maria M. Pavlova; Ognyan D. Bojkov, all of Sofia, Bulgaria

[73] Assignee: Institute Po Obshta I Neorganichna Chimia, Sofia, Bulgaria

[21] Appl. No.: 112,451

[22] Filed: Jan. 16, 1980

[30] Foreign Application Priority Data

Aug. 7, 1979 [BG] Bulgaria .................................. 44586
Nov. 28, 1979 [BG] Bulgaria .................................. 45707

[51] Int. Cl.$^3$ ....................... C01G 41/00; C01G 47/00
[52] U.S. Cl. ........................................... 423/49; 423/54; 423/DIG. 14; 204/105 R; 75/101 BE
[58] Field of Search ................... 423/54, 49, DIG. 14, 423/658.5; 75/101 BE

[56] References Cited

U.S. PATENT DOCUMENTS

| | | | |
|---|---|---|---|
| 3,158,438 | 11/1964 | Kurtak | 423/54 |
| 3,558,268 | 1/1971 | Prater et al. | 75/101 BE |
| 3,681,016 | 8/1972 | Litz | 423/54 |
| 3,733,388 | 5/1973 | Ziegler | 75/101 BE |

FOREIGN PATENT DOCUMENTS 503202 5/1954 Canada ................................. 75/101 BE

OTHER PUBLICATIONS

Huffman et al., "J. Inorg. Nucl. Chem." vol. 3, Aug., 1956, pp. 49-53.
Goishi et al., "J. of American Chemical Soc.", vol. 74, 1952, p. 6109.

Primary Examiner—Herbert T. Carter
Attorney, Agent, or Firm—Karl F. Ross

[57] ABSTRACT

Rhenium and tungsten are recovered from a rhenium tungsten alloy by electrochemically dissolving the alloy in substantially 4 to 5 normal sodium hydroxide to form a rhenium-containing solution, solvent extracting the rhenium-containing solution with an organic heteroatom-containing solvent (e.g. pyridine) or acetone to form a second solution of the solvent containing rhenium, distilling the solvent from the second solution to form a raffinate containing rhenium, adding sulfuric acid to the raffinate to adjust the pH thereof to about 1, extracting tungsten from the raffinate with a solution of trioctylamine in kerosene containing octyl alcohol, and subjecting the raffinate containing sodium perrhenate to ion exchange to eventually convert it to ammonium perrhenate.

6 Claims, No Drawings

METHOD FOR EXTRACTING RHENIUM AND TUNGSTEN FROM WASTES OF RHENIUM-TUNGSTEN ALLOYS

FIELD OF THE INVENTION

The invention refers to a method for extracting rhenium and tungsten from wastes formed from rhenium-tungsten alloys.

BACKGROUND OF THE INVENTION

A method is known for extracting and regenerating rhenium and tungsten from rhenium-tungsten alloys by dissolving the alloy in hydrogen peroxide, heating the solution in a water bath and subjecting the resulting solution, containing $HReO_4$, $H_2WO_5$ and $H_2O_2$, to boiling in order to decompose the excess hydrogen peroxide and to convert $H_2WO_5$ into tungstic acid which forms a precipitate and is filtered through a paper filter or a glass crucible C-4. After rinsing twice the tungstic acid using hot water, the filtrate containing perrhenic acid is recovered and rhenium is separated in the form of potassium or ammonium perrhenate (see A. I. Lazerev, *Zh. priklad. khim,* 33, 468 (1960)).

In another modification of the method, the solution is heated to boiling, precipitated with potassium hydroxide and allowed to stay for 2 hours in a water-bath. Then it is cooled and the resulting precipitate of calcium tungstate is filtered and rinsed with a saturated solution of potassium hydroxide. The filtrate that contains $Ca^{2+}$ and $ReO_4^-$ is run through an ion exchange column filled with cationite KY-2 for the retention of $Ca^{2+}$. To obtain full recovery of perrhenic acid, the column is scrubbed several times using water. The eluate solution together with the scrubbing waters is neutralized with potassium hydroxide or ammonia and is evaporated by infrared heating to dry crystals of potassium or ammonium perrhenate, respectively.

A disadvantage of this method is that the dissolution process is accompanied by intensive decomposition of hydrogen peroxide on the surface of the alloy. Consequently, the solution has to be replaced periodically by fresh amounts of peroxide. The large number of operations used in the method is time-consuming and labor-consuming and does not ensure complete separation of the extracted elements.

Another method for extracting rhenium for scraps of tungsten alloys treats the alloy with sodium nitrate at 500°–600° C., the water-soluble salts being extracted from the resulting melt using hot water (see Report dated Aug. 31, 1975 of Prof. Ortwin Bobleter, Institute of Radiochemistry and Applied Physical Chemistry, University of Insbruck, Austria). From the resulting solution that contains sodium perrhenate and sodium tungstate, rhenium is precipitated as potassium perrhenate by adding potassium chloride and tungstate remains in the solution.

A disadvantage of the method is the release of large amounts of nitrogen oxides which pollute the air. The method also requires working under strong ventilation and involves a considerable loss of rhenium.

OBJECT OF THE INVENTION

It is the object of this invention to provide a method extracting rhenium and tungsten from wastes of rhenium-tungsten alloys which has a high degree of extraction and separation of the two elements and is rapid and simple.

DESCRIPTION OF THE INVENTION

The improved method comprises dissolving the alloy electrochemically in a solution of 4–5 N sodium hydroxide; from the resulting solution rhenium is extracted as sodium perrhenate by solvent extraction using an organic solvent that contains a a heteroatom and subsequent distillation of the extractant; from the raffinate, after dilution with, at the maximum, an equal volume of water and neutralization with sulphuric acid to pH 1, tungstate is extracted using a kerosine solution of trioctylamine with an additive of octyl alcohol and further stripped from the organic phase with ammonia. The preparation of ammonium perrhenate is carried out using ion exchange.

The invention offers the following advantages:

oxidation proceeds electrochemically without the need for additional reagents;

it ensures a maximum rate of the process of dissolving the alloy;

it ensures a high degree of extraction of rhenium directly from the solution resulting from the dissolution of the alloy;

very good separation of rhenium from tungsten is obtained;

a high degree of tungsten extraction from the raffinate is obtained at low consumption of extractant;

simple equipment is used;

the number and duration of the operations for recovery of rhenium and tungsten from industrial wastes are reduced; and minimal free area of the anode which is in contact with the solution is ensured so that the process of dissolution is not encumbered with the process of anode decomposition of water and consequently the electric current passing through the system is used efficiently.

SPECIFIC EXAMPLES

Example 1

A definite amount of rhenium-tungsten alloy scraps (about 10 g) is placed on a platinum plate serving as anode of the electrolytic cell made of plastic, filled with 4 N NaOH as an electrolyte and containing a platinum cathode. For 5 hours, current (9–10 V; 2.5–3 A) is passed through the cell and this results in complete dissolution of the sample. Before removal of the electrodes from the cell, the polarity is changed several times per second so as to dissolve the metal deposited partially on the cathode. The resulting solution is extracted once in a plastic stoppered separation funnel with an equal volume of pyridine which is an effective extractant for rhenium and extracts rhenium instantaneously in a quantitative way. The resulting pyridine extract is distilled thus regenerating the extragent. The resulting sodium perrhenate contains 99.8% of the amount of rhenium available in the analyzed sample. The raffinate obtained after the pyridine extraction is neutralized with sulphuric acid to pH 1 and diluted with an equal volume of water so as to reduce the competing action of the sulphate ions in the subsequent single extraction of the solution with a 10% solution of trioctylamine in kerosine in sulphate form and 20% of octyl alcohol for the tungsten extraction. A two-fold back-extraction for five minutes of tungsten with ammonia (25 g/l) (in a 1:1 phase ratio) follows, thus regenerating tungsten as ammonium paratungstate. Sodium perrhenate is subjected to ion exchange to obtain ammonium perrhenate 3 N, using Dowex 50 W×8 in hydrogen form. Neutralization with ammonia and concentration follow.

Example 2

A definite amount of wastes of rhenium-tungsten alloy is placed in a teflon vessel over a platinum plate positioned at the bottom of the vessel and serving as anode. 4 N NaOH is used as electrolyte and a platinum plate is used as the cathode. By passing current (about 9 V, about 4.5 A) for the duration of two hours through the system, the amount of the scraps dissolved into the solution is equal to the amount calculated theoretically (10.3 g) for 100% current efficiency. The solution is extracted twice with ⅓ of its volume of acetone in each stage and following example 1 from the joint acetone extracts, sodium perrhenate is obtained which is further subjected to ion exchange so as to obtain ammonium perrhenate 3 N. See example 1.

We claim:

1. A method of recovering rhenium and tungsten from wastes containing rhenium and tungsten alloys and of separating the two elements which comprises the following steps:
    (a) electrochemically dissolving said wastes containing rhenium and tungsten alloys in substantially 4 to 5 normal sodium hydroxide to form a solution containing rhenium and tungsten;
    (b) solvent extracting said solution containing rhenium and tungsten with an organic solvent capable of selectively removing rhenium from said solution thereby forming a second solution of said solvent containing the rhenium and leaving behind a raffinate containing the tungsten;
    (c) distilling off the solvent from the second solution formed during step (b) to produce sodium perrhenate;
    (d) converting the sodium perrhenate to ammonium perrhenate by ion exchange;
    (e) adding sulfuric acid to the raffinate formed during step (b) to adjust the pH thereof to about 1; and
    (f) extracting tungsten from the raffinate with a solution of trioctylamine in kerosene and octyl alcohol.

2. The process defined in claim 1, step (e), wherein said raffinate from step (b) is diluted with up to substantially an equal volume of water prior to the addition of sulfuric acid thereto in step (e).

3. The process defined in claim 1 further comprising the step of stripping tungsten from said solution of trioctylamine in kerosene and octyl alcohol.

4. The method defined in claim 1, claim 2 or claim 3 wherein the organic solvent of step (b) is selected from the group consisting of pyridine and acetone.

5. The method defined in claim 4 wherein the organic solvent of step (b) is pyridine.

6. The method defined in claim 4 wherein the organic solvent of step (b) is acetone.

* * * * *